United States Patent
Cavaliere et al.

(10) Patent No.: US 9,544,050 B2
(45) Date of Patent: Jan. 10, 2017

(54) OPTICAL SUPERVISORY CHANNEL

(75) Inventors: Fabio Cavaliere, Vecchiano (IT); Giulio Bottari, Leghorn (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 133 days.

(21) Appl. No.: 14/356,929

(22) PCT Filed: Nov. 9, 2011

(86) PCT No.: PCT/EP2011/069742
§ 371 (c)(1),
(2), (4) Date: Sep. 11, 2014

(87) PCT Pub. No.: WO2013/068039
PCT Pub. Date: May 16, 2013

(65) Prior Publication Data
US 2015/0043907 A1 Feb. 12, 2015

(51) Int. Cl.
  *H04B 10/08* (2006.01)
  *H04B 10/077* (2013.01)
  *H04J 14/02* (2006.01)

(52) U.S. Cl.
  CPC ......... *H04B 10/0775* (2013.01); *H04J 14/025* (2013.01); *H04J 14/0234* (2013.01); *H04J 14/0246* (2013.01); *H04J 14/0247* (2013.01); *H04J 14/0282* (2013.01)

(58) Field of Classification Search
  CPC .. H04B 10/075; H04B 10/077; H04B 10/0775
  See application file for complete search history.

(56) References Cited

U.S. PATENT DOCUMENTS 6,433,903 B1 * 8/2002 Barry ................ H04B 10/0731
                                                    398/79
7,039,314 B2 * 5/2006 Taketomi ........... H04B 10/0775
                                                    398/30
(Continued)

FOREIGN PATENT DOCUMENTS

EP            1349309 A2    10/2003

OTHER PUBLICATIONS

Kilper, D.C., et al. "Optical Performance Monitoring", Journal of Lightwave Technology, IEEE Service Center, New York, NY, US, vol. 22, No. 1, Jan. 1, 2004, pp. 294-304, XP011107635.

*Primary Examiner* — Dzung Tran
(74) *Attorney, Agent, or Firm* — Rothwell, Figg, Ernst & Manbeck, p.c.

(57) ABSTRACT

A supervisory channel is provided on an optical path (31) between nodes of an optical communication network. The nodes are arranged to use a set of wavelengths allocated for carrying traffic channels. An optical signal (16) which carries a supervisory channel is generated at a supervisory channel transmitter (15) and added (12) to the optical path (31) downstream of an optical amplifier (11). The optical signal (16) has a wavelength which is one of the set of wavelengths allocated for carrying traffic. The method is performed at a time when the wavelength is not being used to carry traffic. An impairment parameter of the received optical signal is measured at a supervisory channel receiver (15). The receiver is a coherent receiver and the impairment parameter is chromatic dispersion or polarization mode dispersion.

15 Claims, 9 Drawing Sheets

(56) References Cited

U.S. PATENT DOCUMENTS

| | | | |
|---|---|---|---|
| 2005/0220387 A1* | 10/2005 | Asahi | H04B 10/0771 385/4 |
| 2009/0123147 A1 | 5/2009 | Wolf et al. | |
| 2009/0142061 A1* | 6/2009 | BuAbbud | H04B 10/0771 398/79 |
| 2009/0190920 A1* | 7/2009 | Ohtani | H04J 14/0221 398/7 |
| 2009/0238563 A1* | 9/2009 | Fukashiro | H04B 10/0775 398/30 |
| 2011/0229128 A1* | 9/2011 | Sakamoto | H04B 10/0775 398/29 |
| 2012/0237206 A1* | 9/2012 | Izumi | H04B 10/2572 398/25 |

\* cited by examiner

OPTICAL SUPERVISORY CHANNEL

CROSS-REFERENCE TO RELATED APPLICATION

This application is a 35 U.S.C. §371 National Phase Entry Application from PCT/EP2011/069742, filed Nov. 9, 2011, and designating the United States.

TECHNICAL FIELD

This invention relates to providing an optical supervisory channel in an optical communication network.

BACKGROUND

Today, dynamic optical networks use all optical switching technology such as Wavelength Selective Switch (WSS) embedded in (Remotely) Reconfigurable Add Drop Multiplexer (ROADM). The Generalised Multiprotocol Label Switched (GMPLS) application to photonic networks is called Wavelength Switched Optical Network (WSON).

The International Telecommunication Union ITU-T G.692 Recommendation defines an Optical Supervisory Channel (OSC) as "A channel that is accessed at each optical line amplifier site that is used for maintenance purposes including (but not limited to) remote site alarm reporting, communication necessary for fault location, and orderwire. The Optical Supervisory Channel is not used to carry payload traffic".

In practical implementations the OSC is an additional wavelength $\lambda_{OSC}$, usually outside the optical amplifier (Erbium-Doped Fibre Amplifier (EDFA)) amplification band at 1510 nm, 1620 nm, 1310 nm or another proprietary wavelength. The OSC carries information about the DWDM optical signal as well as remote conditions at the optical terminal or amplifier site. It is also normally used for remote software upgrades and network management information. The OSC signal structure is vendor specific, even if the ITU standard suggests using an OC-3 signal structure. The OSC is always terminated at intermediate nodes, where it receives local information before retransmission. This contrasts with wavelengths which carry client signals (i.e. traffic), which are only terminated at endpoints of a lightpath.

Increasing bit rates from 2.5 Gbit/s to 100 Gbit/s and higher, combined with the increasing number of wavelengths from 16 to 160 and the narrowing of the channel spacing, impacts the routing of a lightpath due to physical constraints, which are often referred to as impairments. The effect of such impairments should be considered during the process of computing a lightpath between a source node and a destination node to be sure that the optical signal carried over the lightpath will have sufficient quality to detect the carried traffic at the receiver interface. This quality is usually quantified using a Quality of Transmission (QoT) parameter, like the Q factor, which is strictly related to the Bit Error Rate (BER).

In an opaque optical network, a traffic-carrying optical signal is converted between the optical domain and the electrical domain at each intermediate node. In a transparent optical network a lightpath remains in the optical domain between the source node and destination node, without conversion between the optical domain and electrical domain at intermediate nodes. So, it is only possible to monitor the signal quality at the destination endpoint of a lightpath, such as by measuring the BER at the receiver, or at an intermediate regeneration point, if one is provided along the lightpath. BER provides a measurement of the QoT as resulting from the concurrent action of multiple physical effects without distinguishing among each single cause of detrimental effects.

This scarce and limited availability of quality related information makes it difficult to perform a path computation which is fully aware of the real impact of the impairments that the signal will experience on the path from the source node to the destination node.

SUMMARY

An aspect of the invention provides a method of providing a supervisory channel on an optical path between a first node and a second node of an optical communication network. The first node comprises an optical amplifier. The first node is arranged to use a set of wavelengths allocated for carrying traffic channels. The method comprises, at the first node, generating an optical signal which carries a supervisory channel at a supervisory channel transmitter. The method further comprises, at the first node, adding the optical signal to the optical path downstream of the optical amplifier. The optical signal has a wavelength which is one of the set of wavelengths allocated for carrying traffic and the method is performed at a time when the wavelength is not being used to carry traffic.

An advantage of a method according to an embodiment of the invention is that it is possible to monitor one or more impairment parameters of a wavelength which is allocated to carrying traffic, on a span-by-span basis of the network. The parameters obtained by this method can be used in various ways, such as: routing of a lightpath; wavelength assignment of a lightpath; and validation of a lightpath.

Span-by-span monitoring allows a source of a problem to be more readily identified, such as a fibre which is thermally or mechanically stressed. This contrasts with monitoring performed at an endpoint of a lightpath, which simply indicates that a problem has occurred somewhere along the lightpath but does not allow the source of the problem to be identified.

An advantage of a method according to an embodiment of the invention is that there is no need to provide an additional transmitter to transmit a test signal along a span, because the optical signal which carries the supervisory channel serves as a test signal.

Advantageously, the supervisory channel transmitter comprises an optical source which is capable of operating at any of the set of wavelengths allocated for carrying traffic channels. The step of generating an optical signal comprises tuning the optical source to a selected wavelength within the set of wavelengths.

The method can comprise causing the supervisory channel transmitter to sequentially operate at each of a plurality (or all) of the set of wavelengths which are normally used to carry traffic channels. In this way, the wavelengths normally used to carry traffic are scanned.

Another aspect of the invention provides a method of providing a supervisory channel on an optical path between nodes of an optical communication network. The nodes are arranged to use a set of wavelengths allocated for carrying traffic channels. The method comprises, at a receiving one of the nodes, removing an optical signal which carries a supervisory channel from the optical path, upstream of an optical amplifier at the node. The method further comprises receiving the optical signal at a supervisory channel receiver. The method further comprises measuring at least one impairment parameter of the received optical signal. The optical signal has a wavelength which is one of the set of wavelengths allocated for carrying traffic and the method is performed at a time when the wavelength is not being used to carry traffic.

Advantageously, the supervisory channel receiver is a coherent receiver and the at least one signal quality parameter is: Chromatic Dispersion (CD); Polarisation Mode Dispersion (PMD). While direct detection, traditionally used in 2.5/10/40 G DWDM systems, provides the ability to measure just the amplitude of the received optical signal, coherent detection can detect amplitude, phase, and polarisation of the optical signal. The preservation of the optical phase can be used to cost-effectively measure and compensate optical transmission impairments such as CD and PMD, in the electrical domain. Coherent detection is the candidate technology for the incoming high bit rates (40 G and beyond) in DWDM optical networks.

The method can further comprise receiving an instruction to control operation of the supervisory channel transmitter from an entity external to the first node, such as a Network Management System (NMS), or via the control plane.

Another aspect of the invention provides a method of acquiring impairment parameter values for an optical path between a first node and a second node of an optical communication network. The method comprises controlling the first node of the network to generate an optical signal which carries a supervisory channel at a first wavelength. The first wavelength is one of the set of wavelengths allocated for carrying traffic at a time when the wavelength is not being used to carry traffic. The method further comprises receiving the optical signal at the second node and measuring at least one impairment parameter of the received optical signal. The method acquires an impairment parameter value for the span at the first wavelength.

Further aspects of the invention provide apparatus for performing any of the described or claimed methods.

An aspect of the invention provides an apparatus for use at a first node of an optical communication network for providing a supervisory channel on an optical path between the first node and a second node. The first node comprises an optical amplifier. The first node is arranged to use a set of wavelengths allocated for carrying traffic channels. The apparatus comprises a supervisory channel transmitter for generating an optical signal carrying the supervisory channel. The apparatus further comprises an optical coupler for adding the optical signal to the optical path downstream of the optical amplifier at the first node. The optical signal has a wavelength which is one of the set of wavelengths allocated for carrying traffic and the supervisory channel transmitter is arranged to generate the optical signal when the wavelength is not being used to carry traffic.

Another aspect of the invention provides apparatus at a node for providing a supervisory channel on an optical path between nodes of an optical communication network. The node being arranged to use a set of wavelengths allocated for carrying traffic channels. The node comprises an optical amplifier. The apparatus comprises an optical filter for removing an optical signal which carries a supervisory channel from the optical path, upstream of the optical amplifier. The apparatus further comprises a supervisory channel receiver arranged to receive the optical signal and to measure at least one impairment parameter of the received optical signal. The optical signal has a wavelength which is one of the set of wavelengths allocated for carrying traffic and the supervisory channel receiver is arranged to receive the optical signal at a time when the wavelength is not being used to carry traffic.

A node can comprise one or more apparatus for receiving a wavelength carrying a supervisory channel on respective optical paths in a transmission direction towards the node, and one or more apparatus for transmitting a wavelength carrying a supervisory channel on respective optical paths in a transmission direction from the node. Supervisory channel data may be forwarded between an optical supervisory channel receiver and one or more optical supervisory channel transmitters. Supervisory channel data may be added by the node.

The term "supervisory channel" can comprise, in broadest terms, a channel which is used for any purpose other than carrying traffic (i.e. payload traffic of clients of the optical communication network). The supervisory channel can be used for one or more of the purposes stated in ITU-T G.692 Recommendation, i.e. maintenance purposes including (but not limited to) remote site alarm reporting, communication necessary for fault location, and orderwire. The supervisory channel can be used to carry data for software updates at a node. The supervisory channel can be used to carry information about the multi-wavelength optical signal or conditions at a remote node (e.g. conditions of an optical terminal or optical amplifier). The supervisory channel may be used in a proprietary way which differs to the definition given in ITU-T G.692.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable medium can be a non-transitory medium. The machine-readable instructions can be downloaded to the storage medium via a network connection.

BRIEF DESCRIPTION OF THE DRAWINGS

Embodiments of the invention will be described, by way of example only, with reference to the accompanying drawings in which.

DETAILED DESCRIPTION

Figure 1:
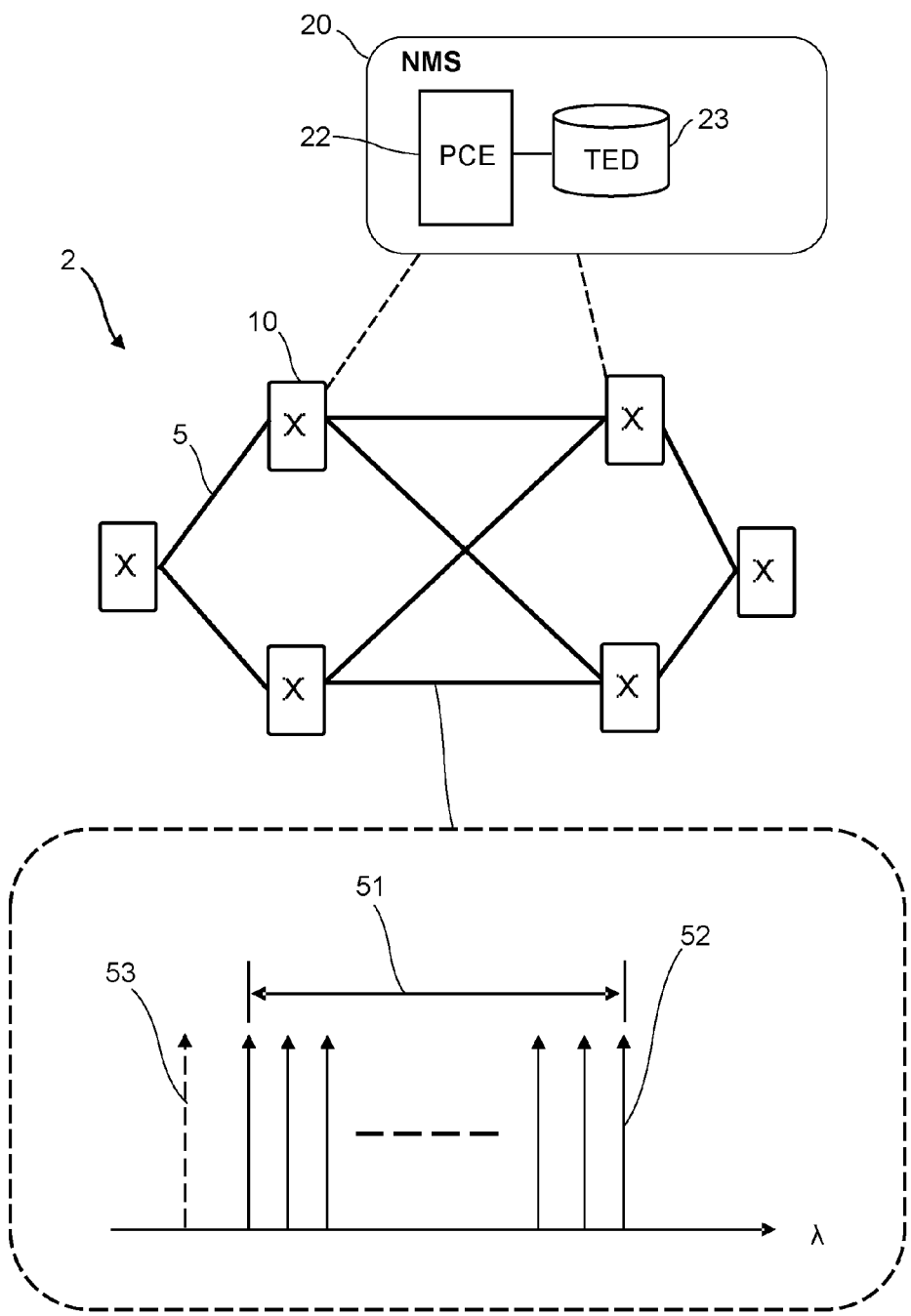
FIG. 1 shows an optical communication network and a set of optical wavelengths used in the network of FIG. 1.

FIG. 1 shows an example optical communication network 2 with nodes 10. Optical transmission links 5 connect nodes 10. Traffic is carried on links (also called spans) 5 by wavelength channels called lambdas. Connections or lightpaths are established in the network 2. Each lightpath is established between a pair (or more) of nodes 10 of the network 2. The terms "connection" and "lightpath" will be used interchangeably. A lightpath can pass via intermediate nodes. In a transparent optical network, lightpaths are established with the aim of minimising the number of occasions when the optical signal is regenerated at intermediate nodes. Each node has network interfaces for optically transmitting traffic on lambdas and for optically receiving traffic on lambdas. A node 10 connects to multiple links 5 and can comprise a wavelength selective switch (WSS). At a node 10, traffic is received at a network interface on a wavelength of an ingress link 5, the traffic is forwarded to a required egress network interface, and is transmitted on a wavelength of an egress link 5. A node in an optical network is typically called a Reconfigurable Optical Add Drop Multiplexer (ROADM). A node 10 can forward traffic to other nodes 10 of network 2, or can add traffic received from other nodes not forming part of network 2, or drop traffic to other nodes not forming part of network 2.

The network can also comprise a Network Management System (NMS) 20 with an entity called a Path Computation Element (PCE) 22 which is responsible for routing lightpaths, i.e. Routing and Wavelength Assignment (RWA). The PCE uses a Traffic Engineering Database (TED) 23. The TED 23 can store information about wavelength availability to help the PCE to select an end-to-end wavelength colour. Information to verify the optical feasibility of a lightpath in an impairment aware PCE can also be stored in the TED 23. In accordance with an embodiment of the invention, the TED 23 can store values of propagation impairments received from nodes 10.

The NMS can send management information to the nodes 10 to configure operation of the nodes. The PCE can be centralised at a node of the network, or the functionality can be distributed among a plurality of nodes of the network. Similarly, the TED can be centralised or distributed.

Conventionally, the Optical Supervisory Channel (OSC) occupies a fixed wavelength which lies outside the band of wavelengths used to carry traffic. There is a set, or band, 51 of wavelengths 52 allocated for carrying traffic. The wavelength 53 conventionally allocated to the OSC lies outside of this band 51. In the C band for traffic transmission (1530-1565 nm) the OSC is placed below the wavelengths allocated for carrying traffic at 1510 nm.

In accordance with embodiments of the invention, the OSC can selectively occupy one of the wavelengths 52 within the set 51 of wavelengths allocated for carrying traffic. The allocation can be dynamic, i.e. the wavelength used to carry the OSC can vary from time-to-time. The OSC is transmitted on a span-by-span basis. The OSC is terminated at each intermediate node. At each node, a transmitter generates an optical signal carrying the OSC, the optical signal is transmitted along the optical span to the next node, and converted from the optical domain to the electrical domain. This span-by-span transmission of the OSC makes it suitable as a way of measuring signal quality impairments of each span. Advantageously, the node transmitting the OSC, and the node receiving the OSC, can be arranged to operate at any of the set 51 of wavelengths allocated to carrying traffic in order to measure signal quality impairments of the span.

Figure 2:
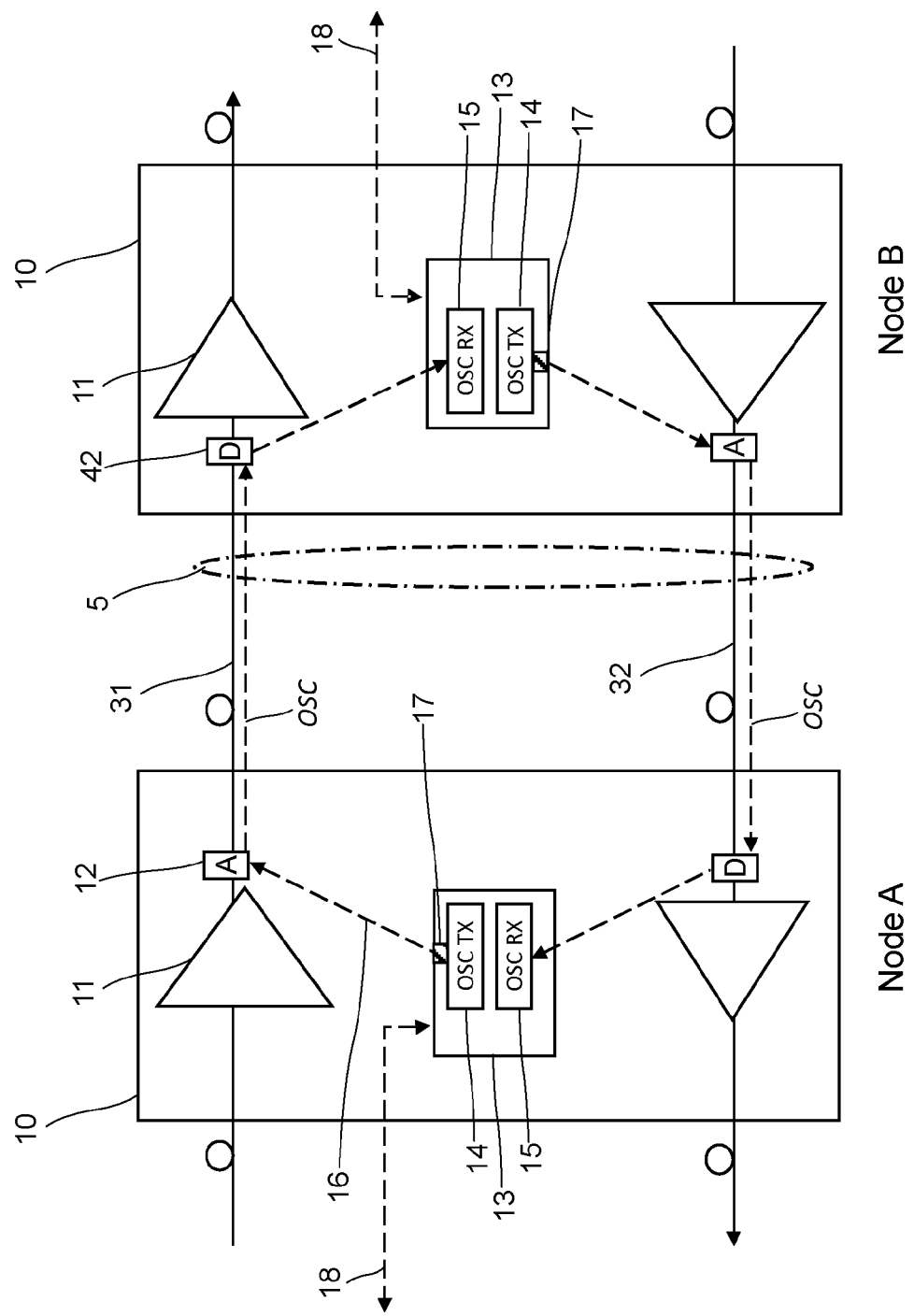
FIG. 2 shows apparatus provided at two adjacent nodes of the network of FIG. 1 for providing a supervisory channel on a span between the nodes.

FIG. 2 shows two adjacent nodes 10 of the optical communication network 2 of FIG. 1. In this example there is a separate fibre span (optical link) for each direction. A link 31 connects Node A to Node B for carrying traffic in a forward direction (A-B) and a link 32 connects Node A to Node B for carrying traffic in the reverse direction (B-A). Each node has a Coherent Optical Supervisory Unit (COSU) 13 which comprises a tunable transmitter 14 and a coherent receiver 15. The transmitter 14 is arranged to generate an optical signal carrying the supervisory signal OSC at a selected wavelength. As described above, the wavelength can be one of the wavelengths which is normally used to carry traffic.

Figure 3A:
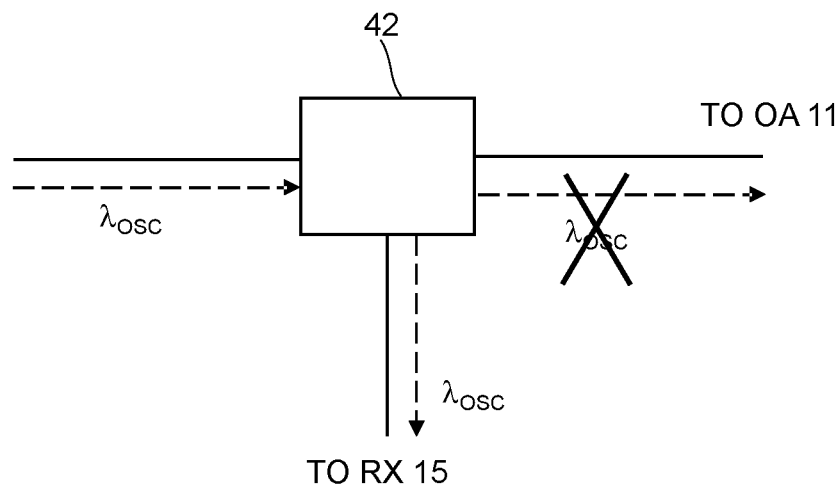
FIGS. 3A and 3B show two possible operating states of an optical device, such as a tunable filter, used at a node of FIG. 2.

The path 16 of the OSC between the two nodes during normal operation is shown. At node A, an optical signal carrying the OSC is added to the optical path between nodes, downstream of the optical amplifier 11 by a device A, 12. Advantageously, device A, 12, is a coupler or any other kind of device which has the effect of adding the optical signal carrying the OSC to the optical path, for transmission towards node B. At node B the OSC is tapped from the link 31 by a device D, 42 and forwarded to the receiver 15 in an Optical Supervisory Unit 13. Advantageously, device D, 42, has the effect of removing the signal carrying the OSC from the link 31 upstream of the optical amplifier 11. Stated another way, device D, 42, blocks propagation of the signal carrying the OSC in the direction towards optical amplifier 11, to prevent onward propagation. This is necessary because the OSC now occupies a wavelength within the pass band of the optical amplifier 11. Device D, 42, also passes the optical signal carrying the OSC in the direction towards receiver 15. The properties of device 42 are shown in FIG. 3A. Filter D, 42, can comprise a tunable drop filter. The drop filter 42 is tunable such that the filter is matched to the wavelength currently being used to carry the OSC. Similarly, on the reverse link 32, an optical signal carrying the OSC is added to link 32 downstream of the optical amplifier at node 40 by a device (e.g. coupler) A. At node 10 the optical signal carrying the OSC is tapped from the link 32 by a device (e.g. tunable filter) D and forwarded to the receiver 15 in the Optical Supervisory Unit 13. Advantageously, device D prevents onward transmission of the signal carrying the OSC towards the optical amplifier.

Figure 3B:
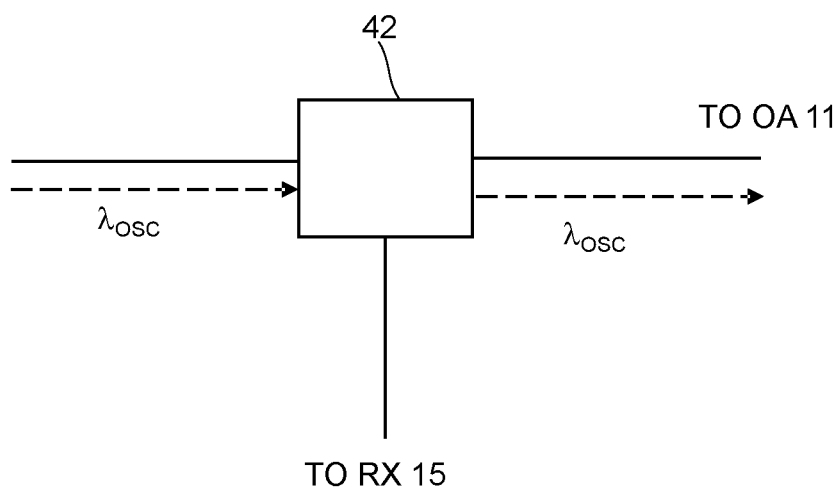

FIG. 3A shows the normal operating state of device 42. Optionally, the device 42 can have a second operating state, shown in FIG. 3B. Device 42 can be controlled to selectively operate in the first state or the second state. In the second operating state, device 42 is arranged to permit onward propagation of the optical signal carrying the OSC. In this operating state, the filter 42 permits the wavelength carrying the OSC to propagate towards the optical amplifier, and on to the next span. The wavelength carrying the OSC is not forwarded to the receiver 15. Operating in the state shown in FIG. 3B allows a sequence of spans to be monitored.

The OSC shown in FIG. 2 can be used to transport the conventional OSC information. This can be information which is received from a preceding span of the network, or information which originates locally in the node. In addition, because there is now an optical signal which is transmitted along a single link 31, 32 between adjacent nodes 10, it is now possible to monitor parameters of each link 31, 32. The ability to control the wavelength at which the OSC is transmitted from one node 10 and received at the next node 10 allows per-link monitoring of parameters, at a selected wavelength. Advantageously, the OSC is received and detected coherently and the OSC transmitter 14 is tunable to any of the wavelengths used for carrying traffic channels within the DWDM grid. When the receiver 15 operates coherently, it is able to monitor parameters such as: chromatic dispersion and polarisation mode dispersion. Measured parameter values are forwarded 18 to another network entity, such as the PCE 22. The measured parameters can be used when calculating an end-to-end lightpath, to ensure that the lightpath will offer a required quality. By providing the PCE 22 with actual measured values for the parameters, rather than theoretical values, the lightpath can be established with a high degree of certainty that it will meet a required quality threshold.

The measured parameter (impairment) values can be communicated from the nodes 10 to other network entities via any suitable protocol, such as PCE communication Protocol (PCEP), Resource Reservation Protocol-Traffic Engineering (RSVP-TE) or Open Shortest Path First-Traffic Engineering (OSPF-TE) protocols.

The OSC TX module 14 is tunable so that an optical signal can be generated at any of the wavelengths used to carry traffic. A shutter device 17 is positioned in the output path of the OSC TX module 14, and is arranged to block passage of light at times when the OSC TX is changing operating wavelength. This ensures that the signal generated by OSC TX 14 does not interfere with existing traffic, as the signal generated by the OSC TX 14 may overlap with one or more of the wavelengths used to carry traffic as the OSC TX is tuned. The shutter device 17 can comprise an optical switch, an attenuator or any other suitable device which can block or restrict passage of light. Shuttering the transmitter 14 will cause (very) short periods in which the OSC is unavailable. Advantageously, OSC data is buffered during these short periods in which the wavelength is re-tuned and the output of the transmitter is shuttered by the shutter device 17. Events such as software upgrades can be scheduled for periods when the OSC is operating at one fixed wavelength value, or the OSC tuning can be inhibited during a period when the software upgrade is performed.

Although the optical signal carrying the OSC is used to measure parameters of a traffic-carrying channel, the optical signal does not need to operate at the same bit rate as the wavelength used for carrying traffic. For example, the optical signal carrying the OSC can operate at 2.5 Gbit/s but the traffic-carrying channel can operate at 10 Gbit/s, 40 Gbit/s, 100 Gbit/s. This allows a significant cost saving because the relevant components, including the DSP on the TXs, are lower cost than would be needed for higher bit rate operation.

Figure 4:
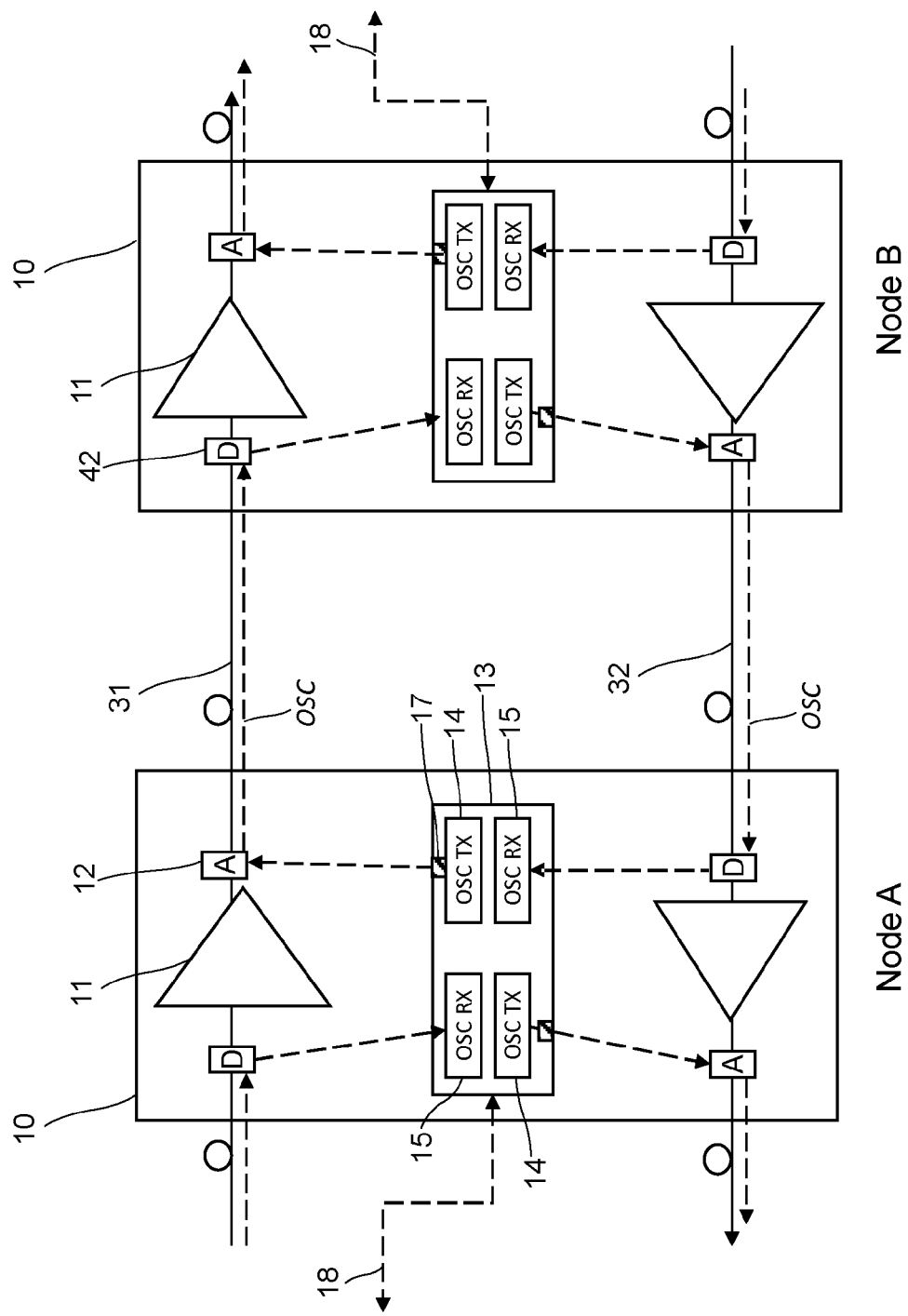
FIG. 4 shows apparatus provided at two adjacent nodes of the network of FIG. 1 for providing a supervisory channel on a sequence of spans.

FIG. 2 shows apparatus at nodes 10 for providing an OSC on links 31, 32 between the nodes 10. Usually, each of the nodes 10 will be connected to at least one further node in a ring or mesh topology. FIG. 4 shows apparatus for providing an OSC on a sequence of spans. Each node 10 comprises a receiver for receiving the OSC over a link from another node, and a transmitter for transmitting the OSC over a link to that node. Information carried via the OSC can be received at a node (e.g. node 10) and forwarded to another node.

Figure 5:
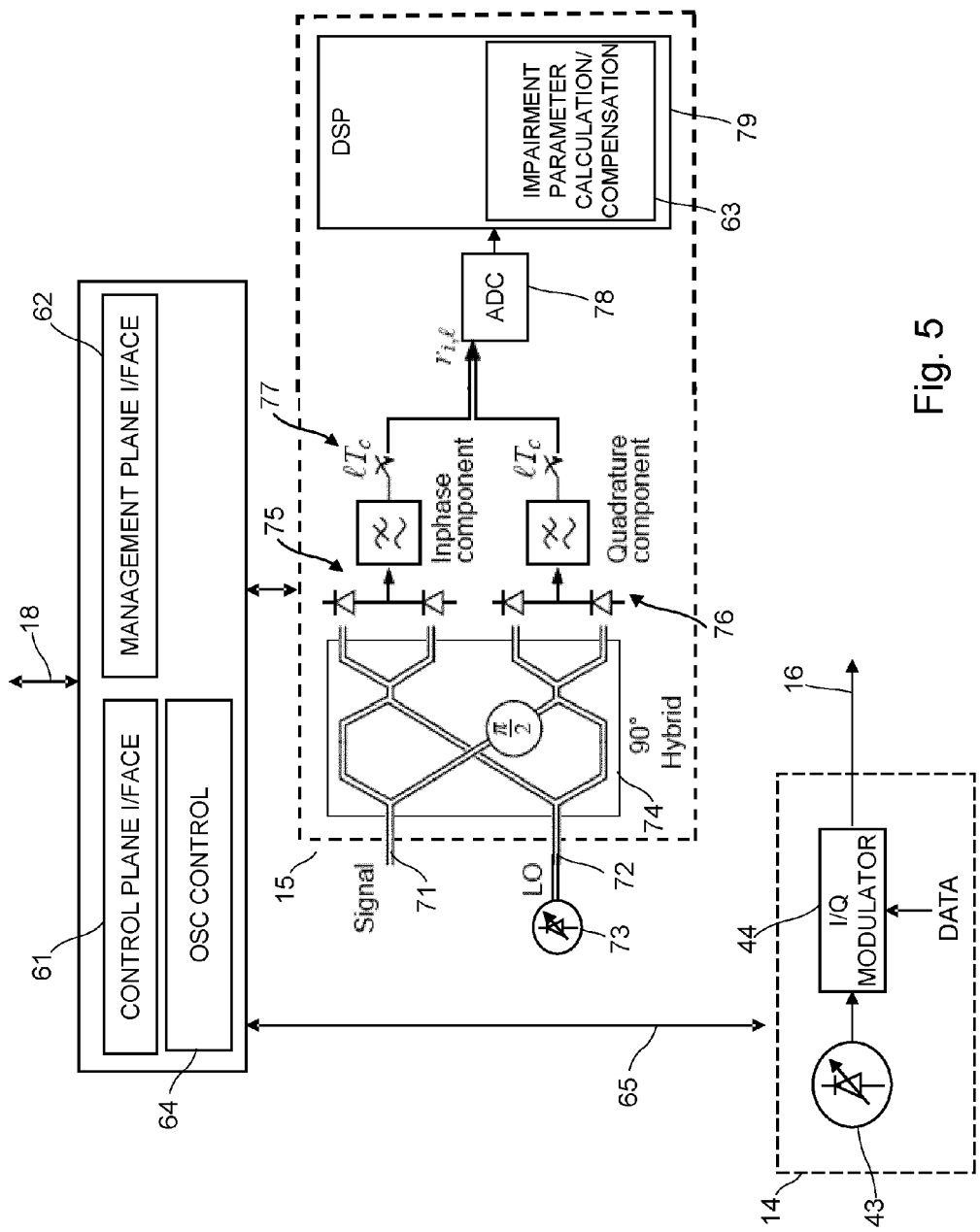
FIG. 5 shows apparatus provided at one of the nodes of the network in more detail.

FIG. 5 shows an embodiment of apparatus provided at a node in more detail. An OSC transmitter 14 comprises an optical source 43, such as a laser, which is tunable across a range of wavelengths. Carrier produced by the optical source is modulated with the data using an in-phase/quadrature (I/Q) modulator 44.

The operating wavelength of the transmitter 14 is controlled by a control path 65 between an OSC control module 64 and the transmitter 14. The OSC control module 64 can connect to the management plane interface 62 and/or the control plane interface 61. OSC control modules 64 in adjacent nodes can communicate with one another using, for example, a control plane protocol such as Link Management Protocol (LMP), to co-ordinate operation of the transmitter 14 in a first node and the receiver 15 in a second node. The co-ordination can include co-ordinating operating wavelength and co-ordinating the timing of any changes in operating wavelength.

The OSC transmitter 14 can be dedicated to generating an optical signal which is modulated with data of the supervisory channel. An optical source in the transmitter (e.g. laser) is tunable to any of the wavelengths normally allocated to carrying a traffic channel. In an alternative embodiment, the OSC transmitter 14 re-uses existing transmitter resources at the node. A node is provided with one or more transmitters which are normally assigned to generating an optical signal which is modulated with data of a traffic channel. The transmitter is normally used to generate an optical signal for a lightpath which originates at the node. The existing transmitter can generate an optical signal at one of the wavelengths allocated to carrying traffic. In this alternative embodiment, at a time when there is a need to monitor one of the traffic channel wavelengths, an optical signal generated by the transmitter is modulated with data for the supervisory channel. The transmitter may be capable of generating an optical signal at a single wavelength (e.g. fixed wavelength laser source) or the transmitter may be capable of generating an optical signal at a range of different traffic carrying wavelengths (e.g. tunable laser source).

A coherent form of OSC receiver 15 is shown in FIG. 4. The received optical signal from device 42 is applied to a first input 71 of the coherent receiver 15. A Local Oscillator (LO) signal generated locally at the receiver by an optical source 73, such as a laser, is applied to a second input 72 of the coherent receiver 15. The received signal and LO signal are mixed in a 90° optical hybrid 74. The optical hybrid 74 generates four output signals. The four optical output signals are then applied to two pairs of balanced photodetectors 75, 76, which convert the optical signals to the electrical domain. At this point the signals are analog. The electrical analog signals are sampled 77 to obtain the in-phase (I) and quadrature (Q) components of the received optical signal. The I and Q samples (that constitute the real and imaginary part of the detected complex sample, respectively) are then applied to an analog-to-digital converter (ADC) 78. Digital values are then applied to a processing unit, shown here as a Digital Signal Processor (DSP) 79. The DSP block 79 can perform a decision device which operates on the signal samples to obtain detected data. An impairment parameter calculation module 79 which calculates impairment parameters of the received signal can form part of the processing unit 79, or can be located elsewhere within the node. The impairment parameter calculation module 79 provides measurement of parameters such as CD and PMD. Advantageously, the impairment parameter calculation module 79 can also correct compensate for impairments such as CD and PMD in the received signal. A comprehensive overview of coherent receivers is described in "Coherent detection in optical fiber systems", Ezra Ip et al, Optics Express 753, Vol. 16, No. 2 21 Jan. 2008.

Figure 6:
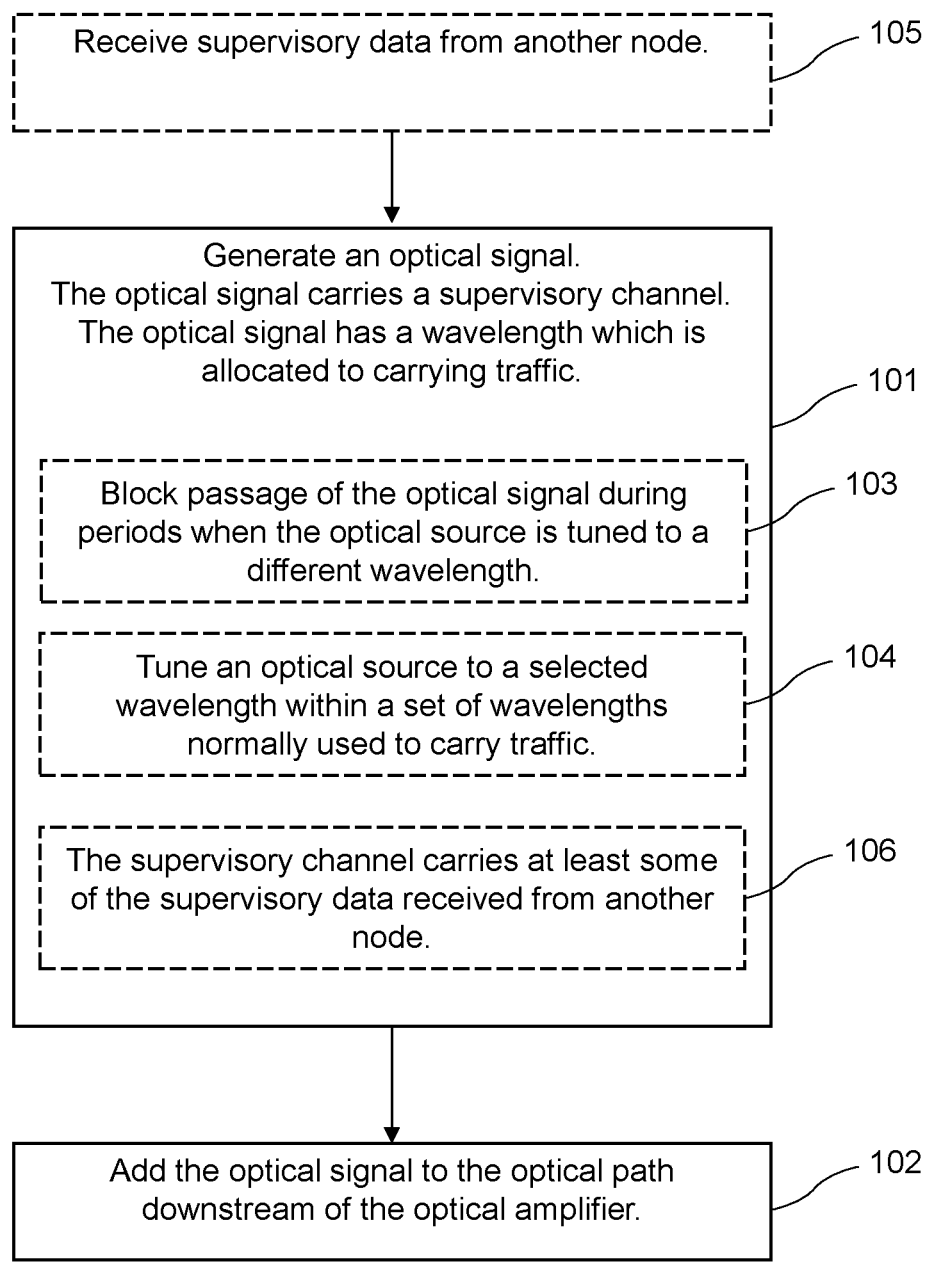
FIG. 6 shows a method of transmitting a supervisory signal at a node of the optical communication network.

FIG. 6 shows a method of transmitting a supervisory signal at a node 10 of the optical communication network. At step 101 an optical signal is generated. The optical signal carries a supervisory channel. The optical signal has a wavelength which is one of the set of wavelengths allocated to carrying a traffic channel. Step 101 is performed at a time when the wavelength is not being used to carry traffic. At step 102 the optical signal carrying the supervisory signal is added to the optical path downstream of the optical amplifier at the node.

Step 101 can comprise any of steps 103, 104, 106. At step 103 passage of the generated optical signal is blocked during periods when the optical source is tuned to a different wavelength. This prevents interference with other wavelengths. At step 104, the optical signal is generated by tuning an optical source to a selected wavelength within a set of wavelengths normally used to carry traffic. The method can comprise receiving supervisory data from another node at step 105, and sending at least some of the received supervisory data at step 106.

Figure 7:
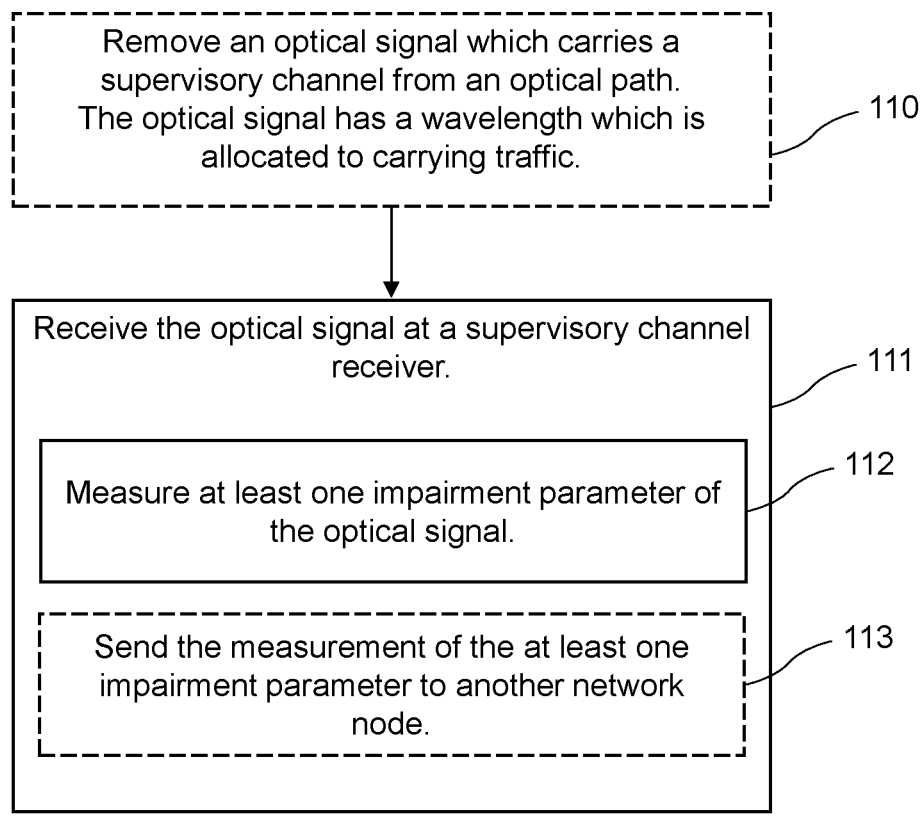
FIG. 7 shows a method of receiving a supervisory signal at a node of the optical communication network.

FIG. 7 shows a method of receiving a supervisory signal at a node 10 of the optical communication network. At step 110 an optical signal which carries a supervisory channel is removed from an optical path between adjacent nodes. The optical signal has a wavelength which is allocated to carrying a traffic. At step 111 the optical signal is received at a supervisory channel receiver. At step 112, at least one impairment parameter of the optical signal is measured. Advantageously, the receiver is a coherent receiver, and the impairment parameters include chromatic dispersion (CD) and Polarisation Mode Dispersion (PMD). Optionally, at step 113, the measurement of the at least one signal quality parameter is sent to another network node, such as a PCE.

The method described above causes a transmitter to generate an optical signal at a wavelength which is one of the set of wavelengths allocated for carrying traffic. The optical signal is generated at a time when the wavelength is not being used to carry traffic. The transmitter is controlled so as to generate the optical signal at a wavelength at which monitoring is required. At times when there is no requirement to monitor one of the set of wavelengths allocated for carrying traffic, the transmitter can generate the optical signal at a nominal wavelength. This can be a wavelength reserved for the OSC, such as the conventional OSC wavelengths of 1510 nm, 1620 nm, 1310 nm or another proprietary wavelength.

The overall process of establishing a lightpath can comprise the steps of: routing, wavelength assignment and validation. The measured parameter (impairment) values can be used in any, or all, of these steps. Firstly, during the routing step, the impairment values can be used to select a sequence of spans least affected by impairments. Secondly, during the wavelength assignment step, the impairment values can be used to select the wavelength(s) where one or more physical phenomena has less impact on the signal. Thirdly, during the validation step, the estimation of the overall link budget can be more accurate when there is a rich set of quality information on a span-by-span basis. This can save the need for regenerators on the path from the source node to the destination node.

Some practical examples of acquiring impairment values will now be described. Firstly, consider that there is a request to activate a 100 Gbit/s lightpath between node A and node Z of an optical communication network of the type shown in FIG. 1. A Path Computation Entity (PCE) 22 performs Impairment Aware Routing and Wavelength Assignment (IA-RWA). The PCE 22 computes a proposed path between nodes A and Z having end to end wavelength continuity and assesses the feasibility of the lightpath using quality estimations. The PCE can:

Pre-scan all of the spans (advantageously, at the actual wavelength that the PCE proposes to assign to the new lightpath) involved in the routing task using the methods described above, and receive impairment measurements that can be used for a more accurate path computation, or Assess, a-posteriori, the quality of the optical signal on the spans belonging to the computed lightpath, at the selected wavelength. This a-posteriori verification can be performed before injecting client traffic on the computed path so as to avoid losing traffic due to inaccurate quality estimations. In this option, a wavelength carrying the OSC can be transmitted along a sequence of spans. The tunable filter 42 at each intermediate node is controlled to operate in the second state, shown in FIG. 3B.

The method can also be used during the operational phase of the network life. the proposed device can help to find and locate spans or network areas where the signal is degraded, and can also identify which physical effect/impairment is likely to be responsible for the such degradation. An example is thermal and mechanical stresses imposed on a fibre in the field, which is the cause of PMD. In case of an active channel that goes over the BER threshold on the receiver, and thereby losing traffic due to degradation, the traffic could be re-routed on an alternative path before activating a span-by-span analysis using the method described above. It is only necessary to analyse the spans traversed by the degraded channel. Parameters acquired from one (or more) of the analysed spans should indicate the cause of the error. Another option is to use free wavelength slots adjacent to, or near to, the degraded wavelength channel. Results of measurements can then be "converted" to the desired wavelength using analytical formulas (e.g. interpolation) or assumed valid as is if performed at a frequency very near to the one of the degraded wavelength channel.

The method can be used to test a portion of an end-to-end lightpath, i.e. a subset of the sequence of spans which compose the end-to-end lightpath from the source node to the destination node. For example, when multiple ligthpaths in a mesh show a degradation in the measured BER on the receiver it is possible to determine which spans the degraded lightpaths have in common. Assume there is a sequence of two spans in common between the degraded lightpaths. The method described above can be used either to: (i) test the sequence of two spans (by operating the intermediate node in the state shown in FIG. 3B), or (ii) test each of the two spans individually.

In case of a path failure, the method can also help to assess the quality of an alternative, not pre-planned, path.

The method can be used to tune the launched power, before injecting the traffic, because it provides a measurement of the effects of a certain power level on a span-by-span basis.

Figure 8:
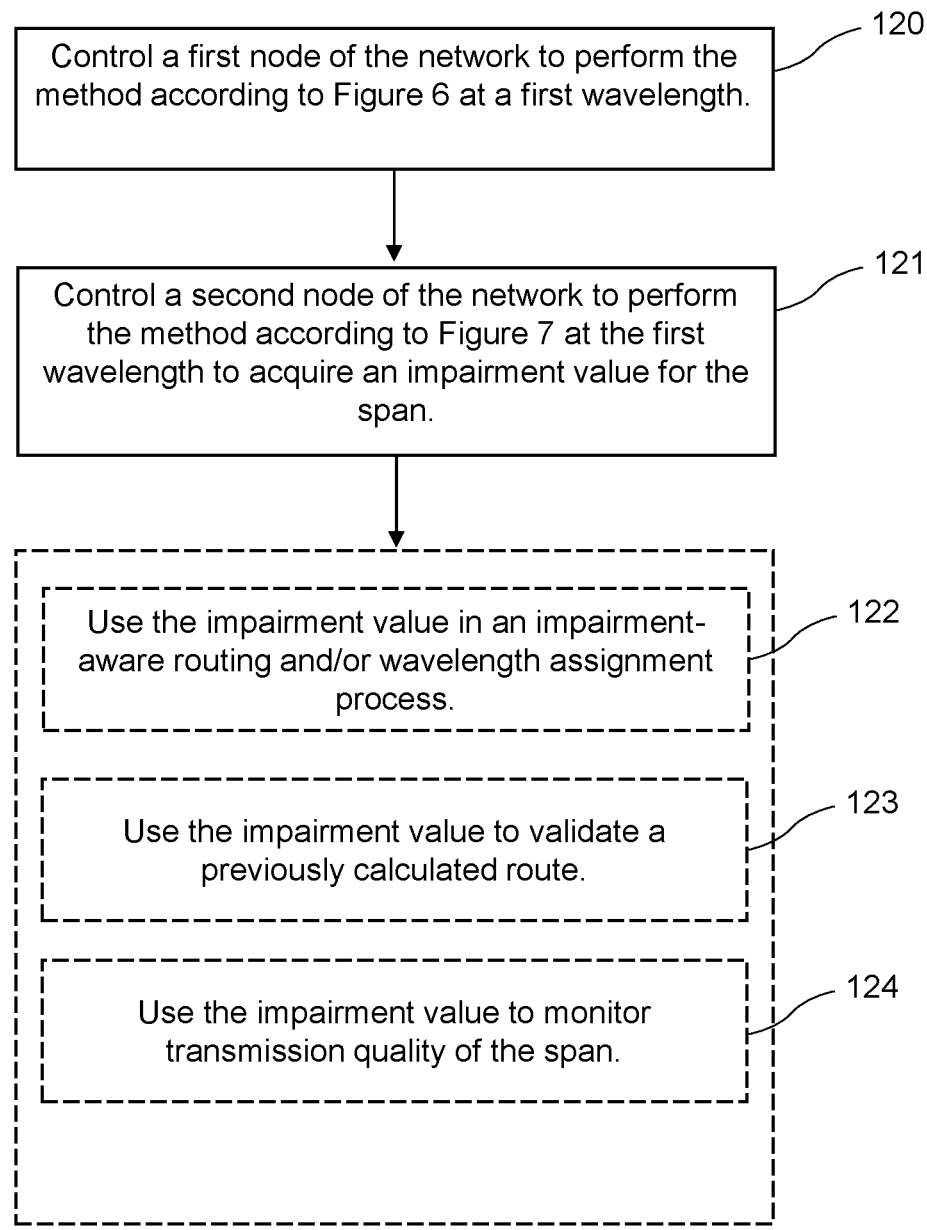
FIG. 8 shows a method of acquiring impairment values for an optical path between nodes of an optical communication network.

FIG. 8 shows a method of acquiring impairment values for an optical path between a first node and a second, adjacent, node of an optical communication network. At step 120, a first node of the network is controlled to perform the method according to FIG. 6 at a first wavelength. At step 121, a second node of the network is controlled to perform the method according to FIG. 7 at the first wavelength to acquire an impairment value for the span. Steps 122-124 are optional. At step 122, the impairment value is used in an impairment-aware routing and/or wavelength assignment process. At step 123, the impairment value is used to validate a previously calculated route. At step 124, the impairment value is used to monitor transmission quality of the span.

In a further embodiment of the invention, a single fibre is used for bi-directional transport, i.e. a single fibre between node A and B is used for carrying traffic in a forward direction (A-B) and a reverse direction (B-A). In this case, different wavelengths on the single fibre can be used for the two directions of OSC2 operation.

Figure 9:
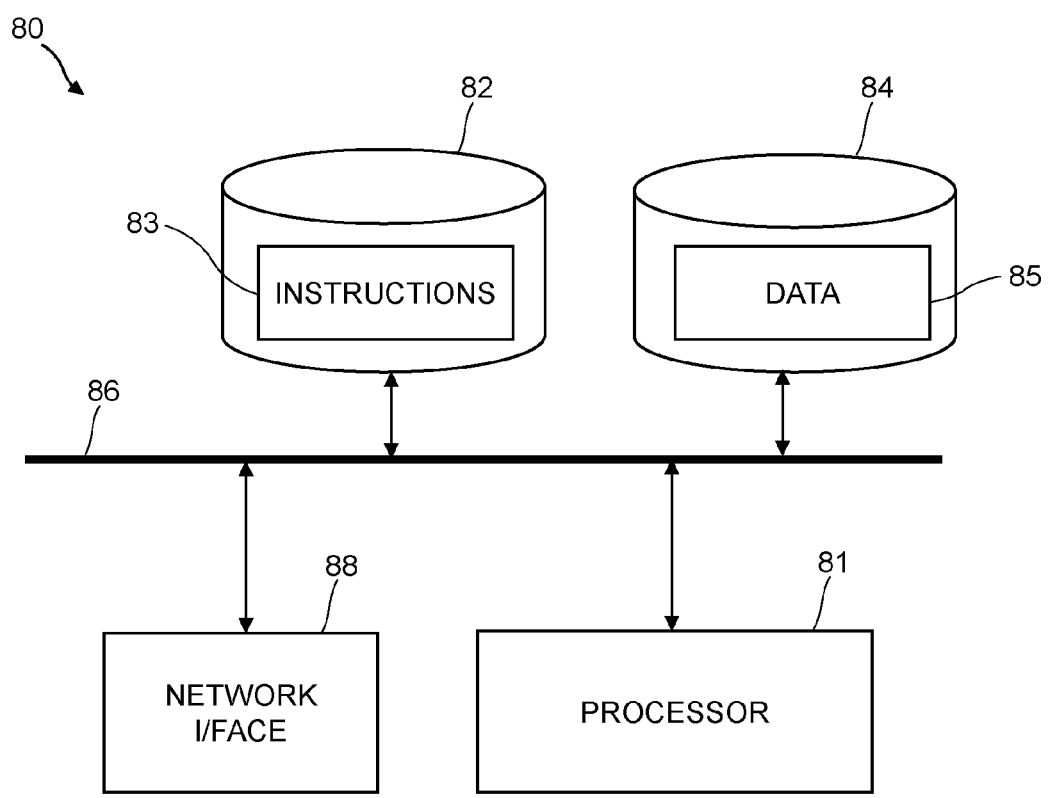
FIG. 9 shows processing apparatus at a node.

FIG. 9 shows an exemplary processing apparatus 80 which may be implemented as any form of a computing and/or electronic device, and in which embodiments of the system and methods described above may be implemented. In particular, an instance of device 80 may be used to implement the OSC control module 64 and an instance of device 80 may be used to implement control functions in the NMS. Processing apparatus 80 comprises one or more processors 81 which may be microprocessors, controllers or any other suitable type of processors for executing instructions to control the operation of the device. The processor 81 is connected to other components of the device via one or more buses 86. The processor-executable instructions 83 may be provided using any computer-readable media, such as memory 82. The memory is of any suitable type such as read-only memory (ROM), random access memory (RAM), a storage device of any type such as a magnetic or optical storage device. Additional memory 84 can be provided to store data 85 used by the processor 81. The processing apparatus 80 comprises one or more network interface inputs 88 for interfacing with other network entities. The network interface 88 may comprise the management plane interface 62 or control plane interface 61 shown in FIG. 5.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of providing a supervisory channel on an optical path between a first node and a second node of an optical communication network, the first node comprising an optical amplifier, the first node being arranged to use a set of wavelengths normally used for carrying traffic channels, the method comprising:
   the first node generating an optical signal which carries a supervisory channel at a supervisory channel transmitter; and
   the first node adding the optical signal to the optical path downstream of the optical amplifier, wherein
   the optical signal has a wavelength which is one of the wavelengths normally used for carrying traffic,
   the first node performs the method at a time when the wavelength is not being used to carry traffic, and
   the step of adding the optical signal to the optical path downstream of the optical amplifier consists of adding the optical signal to the optical path at a point of the optical path that is located between an output of the optical amplifier and an input of the second node, wherein
   the supervisory channel transmitter comprises an optical source which is capable of operating at any of the set of wavelengths normally used for carrying traffic channels, and the step of generating an optical signal comprises tuning the optical source to a selected wavelength within the set of wavelengths normally used to carry traffic.

2. The method according to claim 1, further comprising blocking passage of the optical signal during periods when the optical source of the supervisory channel transmitter is tuned to a different wavelength.

3. The method according to claim 1, further comprising sequentially generating a plurality of optical signals, wherein
   each one of the sequentially generated optical signals carries a supervisory channel,
   each one of the sequentially generated optical signals is sequentially added to the optical path downstream of the optical amplifier,
   each one of the sequentially generated optical signals has a different wavelength than each one of the other sequentially generated optical signals, and
   each one of the sequentially generated optical signals has a wavelength that is normally used for carrying traffic.

4. The method of claim 1, wherein the step of generating an optical signal by a supervisory channel transmitter comprises generating an optical signal having a bit rate which is less than a bit rate of a signal which will be used to carry traffic on the same wavelength.

5. The method of claim 1, further comprising receiving supervisory data from another node of the optical communications network at the first node and wherein the supervisory channel transmitted by the first node carries at least some of the received supervisory data.

6. A computer program product comprising a non-transitory computer readable medium storing instructions which, when executed by a processor, cause the processor to perform the method of claim 1.

7. A method of providing a supervisory channel on an optical path between an output of an optical amplifier of a first node of an optical communication network and an input of an optical amplifier of a second node of the optical communication network, the first and second nodes being arranged to use a set of wavelengths allocated for carrying traffic channels, the method comprising:
   removing from the optical path at a point located upstream of the optical amplifier of the second node an optical signal that carries a supervisory channel, wherein the optical signal was added to the optical path a point located between the output of the optical amplifier of the first node and the input of the optical amplifier of the second node;
   receiving the optical signal at a supervisory channel receiver; and
   measuring at least one impairment parameter of the received optical signal, wherein
   the optical signal has a wavelength which is one of the set of wavelengths allocated for carrying traffic,
   the method is performed at a time when the wavelength is not being used to carry traffic, and
   the step of removing the optical signal from the optical path at a point located upstream of the optical amplifier consists of removing the optical signal from the optical path at a point that is located between the input of the optical amplifier and the output of the first node, wherein the supervisory channel receiver is a coherent receiver and the at least one impairment parameter is one of: chromatic dispersion (CD) and polarization mode dispersion (PMD).

8. The method according to claim 7, wherein the supervisory channel receiver is a coherent receiver and the at least one impairment parameter is polarization mode dispersion (PMD).

9. The method according to claim 7, further comprising sending the measurement of the at least one impairment parameter to another network node.

10. The method of claim 7, further comprising causing the supervisory channel receiver to sequentially operate at each of a plurality of the set of wavelengths which are normally used to carry traffic channels.

11. A method of acquiring impairment parameter values for an optical path between a first node and a second node of an optical communication network comprising:
controlling the first node of the network to perform the method according to claim 1 at a first wavelength; and
controlling the second node of the network to perform a method comprising:
removing from the optical path at a point located upstream of the optical amplifier of the second node an optical signal that carries a supervisory channel;
receiving the optical signal at a supervisory channel receiver; and
measuring at least one impairment parameter of the received optical signal.

12. The method according to claim 11, further comprising at least one of:
using the impairment value in a routing and/or wavelength assignment process;
using the impairment value to validate a previously calculated route; and
using the impairment value to monitor transmission quality of the span.

13. An apparatus for use at a first node of an optical communication network for providing a supervisory channel on an optical path between an output of an optical amplifier of the first node and an input of a second node of the optical communication network, the first node being arranged to use a set of wavelengths allocated for carrying traffic channels, the apparatus comprising:

a supervisory channel transmitter for generating an optical signal carrying the supervisory channel;
an optical coupler for adding the optical signal to the optical path at a point of the optical path located between the output of the optical amplifier and the input of the second node, wherein
the optical signal has a wavelength which is one of the set of wavelengths normally used for carrying traffic, and
the supervisory channel transmitter is arranged to generate the optical signal when the wavelength is not being used to carry traffic.

14. An apparatus, the apparatus comprising:
an optical filter for removing an optical signal from an optical path optically connecting an output of an optical amplifier of a first node and an input of an optical amplifier of a second node, wherein the optical signal carries a supervisory channel, and wherein the optical filter is configured to remove the optical signal from the optical path at a position of the optical path that is located between the output of the first node and the input of the optical amplifier; and
a supervisory channel receiver arranged to receive the optical signal and to measure at least one impairment parameter of the received optical signal, wherein
the optical signal has a wavelength which is one of the set of wavelengths allocated for carrying traffic,
the supervisory channel receiver is arranged to receive the optical signal at a time when the wavelength is not being used to carry traffic, and
the optical signal was added to the optical path a point located between the output of the optical amplifier of the first node and the input of the optical amplifier of the second node, wherein
the supervisory channel receiver is a coherent receiver, and
the at least one impairment parameter is one of: chromatic dispersion (CD) and polarization mode dispersion (PMD).

15. The apparatus according to claim 14, wherein the at least one impairment parameter is polarization mode dispersion (PMD).

* * * * *